United States Patent
Ikeda et al.

(10) Patent No.: US 7,891,568 B2
(45) Date of Patent: Feb. 22, 2011

(54) MEDIA PROCESSING DEVICE AND MAGNETIC HEAD APPLICABLE TO IT

(75) Inventors: Masahiro Ikeda, Nagano (JP); Akihito Wada, Nagano (JP); Hideki Kanebako, Nagano (JP); Hiromi Fukasawa, Nagano (JP); Daisuke Higuchi, Nagano (JP)

(73) Assignee: Nidec Sankyo Corporation (JP)

( * ) Notice: Subject to any disclaimer, the term of this patent is extended or adjusted under 35 U.S.C. 154(b) by 47 days.

(21) Appl. No.: 12/193,622

(22) Filed: Aug. 18, 2008

(65) Prior Publication Data

US 2009/0059422 A1    Mar. 5, 2009

Related U.S. Application Data

(63) Continuation of application No. PCT/JP2007/052881, filed on Feb. 16, 2007.

(30) Foreign Application Priority Data

| Feb. 17, 2006 | (JP) | 2006-041221 |
| Mar. 7, 2006 | (JP) | 2006-061175 |
| Mar. 31, 2006 | (JP) | 2006-096817 |

(51) Int. Cl.
*G06K 7/08* (2006.01)

(52) U.S. Cl. ............ 235/449; 235/493

(58) Field of Classification Search .......... 235/449, 235/493, 487, 380, 382
See application file for complete search history.

(56) References Cited

U.S. PATENT DOCUMENTS

| 5,237,620 A * | 8/1993 | Deaton et al. ............ 705/10 |
| 5,787,619 A | 8/1998 | Urushibata |
| 6,504,623 B1 * | 1/2003 | Ito ........................ 358/1.18 |
| 6,600,823 B1 * | 7/2003 | Hayosh .................... 380/51 |

FOREIGN PATENT DOCUMENTS

| JP | 4-167192 | 6/1992 |
| JP | 7-33307 | 2/1995 |
| JP | 8-235309 A | 9/1996 |
| JP | 2001-283401 | 10/2001 |
| JP | 2003-77104 | 3/2003 |

OTHER PUBLICATIONS

International Search Report for International Application No. PCT/JP2007/052881 mailed May 22, 2007 with English Translation.
Extended European Search Report for Application No./Patent No. 07714411.1-2210/1988545 dated Mar. 19, 2010.

* cited by examiner

*Primary Examiner*—Daniel St.Cyr
(74) *Attorney, Agent, or Firm*—Cantor Colburn LLP

(57) ABSTRACT

A media processing device may include a frame with a transport passage in which information recording media are transported and a magnetic head for processing magnetic information signals on the information recording media. The magnetic head may be embedded in the frame and part of the frame may be interposed between the magnetic head and the transport passage.

11 Claims, 11 Drawing Sheets

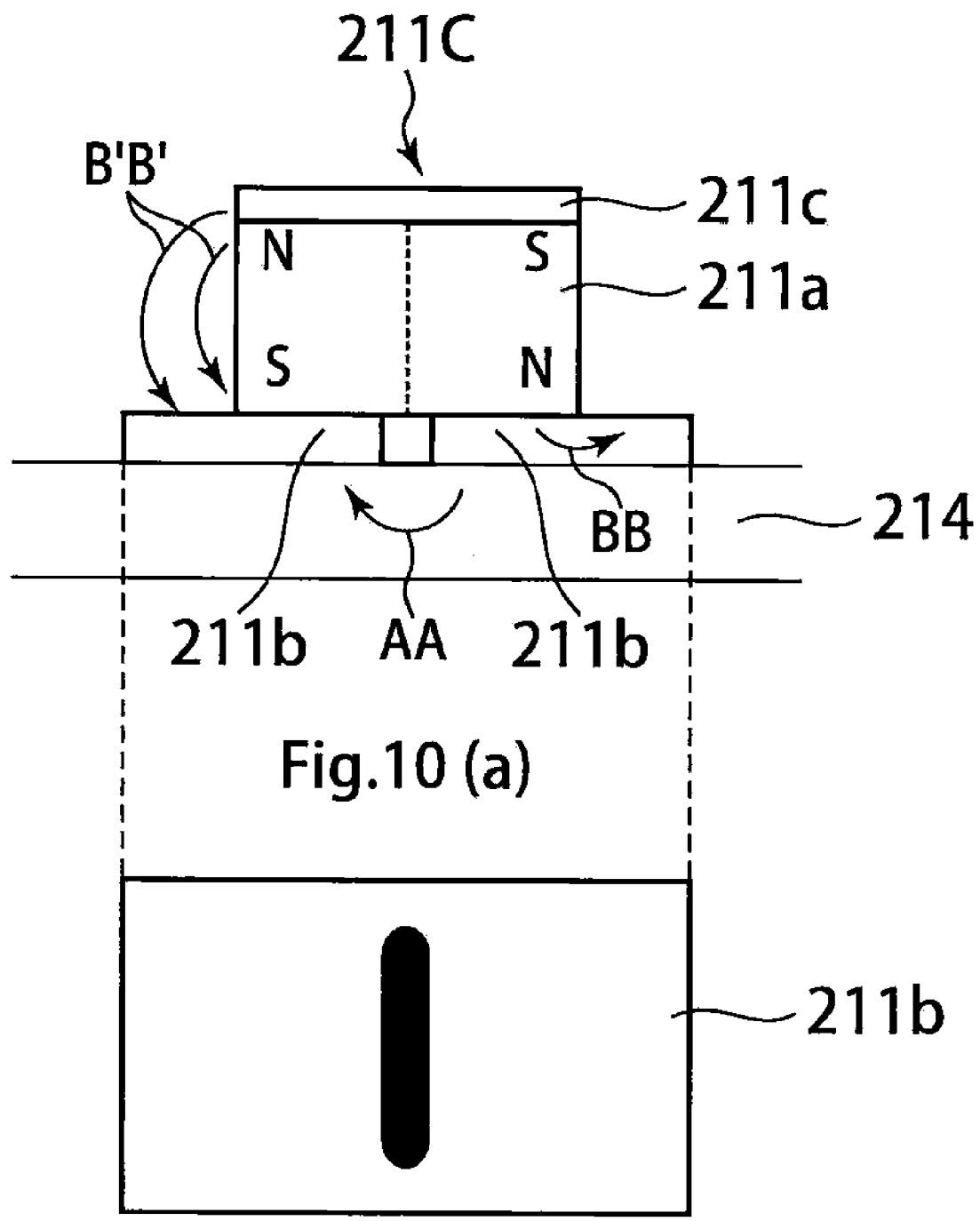

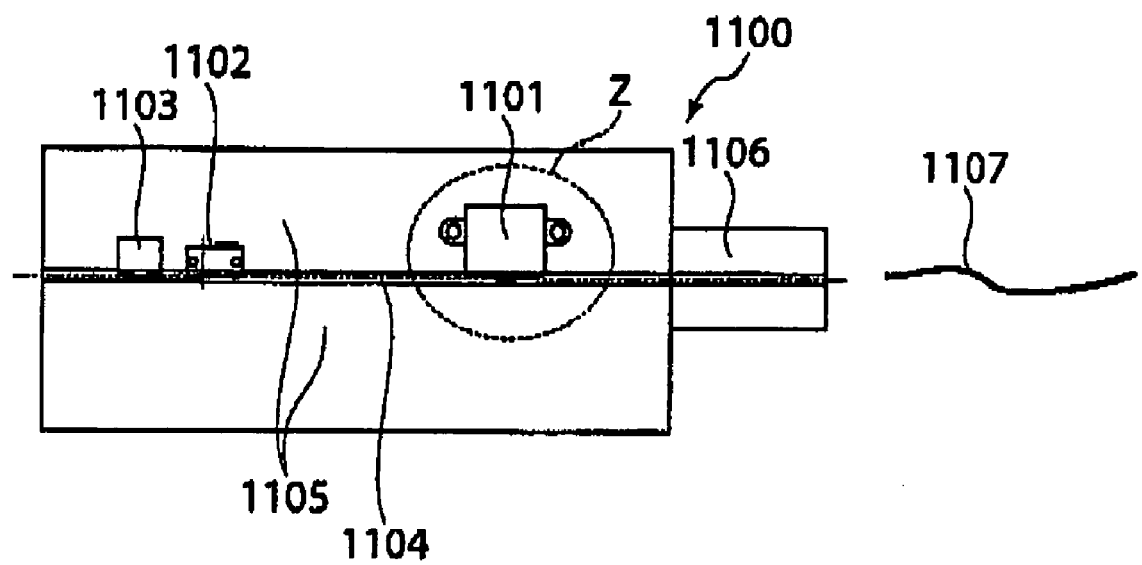
Fig.11 (a) (Prior Art)
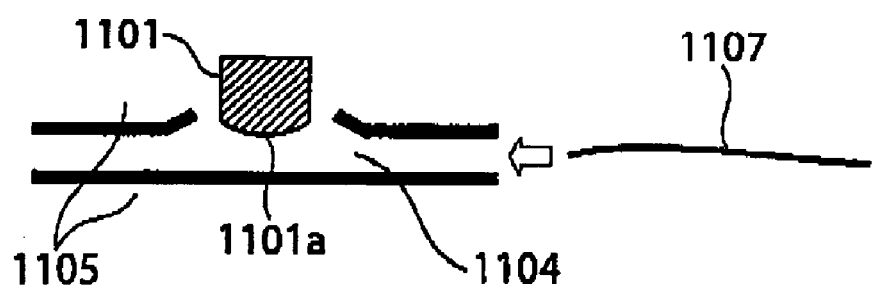
Fig.11 (b) (Prior Art)

MEDIA PROCESSING DEVICE AND MAGNETIC HEAD APPLICABLE TO IT

CROSS REFERENCE TO RELATED APPLICATION

This is a Continuation Application of International Application No. PCT/JP2007/052881, filed on Feb. 16, 2007, the disclosure of which is incorporated herein by reference in its entirety. International Application No. claims priority to Japanese Patent Applications No. 2006-041221, filed Feb. 17, 2006; 2006-061175, filed Mar. 7, 2006; and 2006-096817, filed Mar. 31, 2006; priority to each of which is claimed herein and the contents of each of which are incorporated herein by reference.

TECHNICAL FIELD

The present invention relates to a media processing device for processing various kinds of information recording media such as magnetic cards and checks, and also relates to a magnetic head, applicable to the media processing device, for magnetizing various kinds of information recording media with predetermined magnetic information signals or demagnetizing magnetic information signals which have been recorded.

BACKGROUND

Conventionally, checks which are information recording media may be used for payments at stores in place of cash or credit cards. When paid by check, the store takes the check to a banking institution such as a bank so that cash is drafted from the customer's account to the store's account to complete the payment transaction.

In recent years, such check payment transactions have been made electronically. More specifically described, the magnetic substance such MICR characters (Magnetic Ink Character Recognition: magnetic ink) printed on the front surface of a check encode data (for example, account number and serial number) which is read by a media processing device placed in a store. The read data is transmitted together with the payment amount to a server in a banking institution. According to such an electronic payment system, there is no need to bring the check used for payment to the banking institution, improving efficiency of work.

A conventional structure of the above-mentioned media processing device is described in detail (for example, Patent reference 1). FIG. 11 is a cross-sectional side view of the structure of a conventional media processing device 1100. As shown in FIG. 11(a), a conventional media processing device 1100 mainly comprises a magnetizing head 1100 as a magnetic head, an image sensor 1102, a reading head 1103, a frame 1105 constituting a transport passage 1104, and a gate 1106 through which a check 1107 is inserted.

The MICR characters on the inserted check 1107 are first magnetized by the magnetizing head 1101 arranged upstream of the transport passage 1104, and then the data is read by the reading head 1103 arranged downstream of the transport passage 1104. Note that the MICR character is temporarily magnetized by the magnetizing head 1101 in order to recover the magnetization of the MICR characters, which has been weakened by being exposed to strong magnetic fields during the distribution process so that accurate data reading can be performed by the reading head 1103.

The arrangement of the magnetizing head 1101 shown in FIG. 11(a) is specifically described. FIG. 11(b) is a side cross-sectional view of the enlargement of the vicinity (inside Z framed by a dotted line) of the magnetizing head 1101 of the media processing device shown in FIG. 11(a). As shown in FIG. 11(b), the magnetizing head 1101 is arranged such that a slide-contact face 1101a thereof is exposed to the transport passage 1104 from the frame 1105. When a check 1107 inserted to the media processing device 1100 is transported to the position opposed to the magnetizing head 1101, the check 1107 slides on the slide-contact face 1101a of the magnetizing head 1101 or moves while being in close proximity to the slide-contact face 1101a of the magnetizing head 1101. As the check 1107 passes the position opposed to the magnetizing head 1101 in this manner, the MICR characters on the check 1107 are magnetized as described above.

[Patent reference 1] Unexamined Japanese Patent Application H07-33307 Tokkai (FIG. 1 through FIG. 3)

However, in the media processing device 1100 shown in FIG. 11(a), the frame 1105 constituting the transport passage 1104 is not continuous with the slide-contact face 1101a of the magnetizing head 1101 (see FIG. 11(b)); therefore, a misshaped medium such as a check 1107 with a folded edge may get stuck at the discontinuous section, causing a jam.

Also, dust can easily build up around the discontinuous section of the frame 1105. Particularly, dust easily builds up due to the magnetic field generated by the magnetizing head 1101. Consequently, when a large amount of dust builds up around this section, a jam is caused.

Further, in the media processing device 1100 shown in FIG. 11(a), the magnetizing head 1101 needs to be fitted into a hole bored in the frame 1105; at that time, it may require time and effort to position [the magnetizing head] considering how much the magnetizing head 1101 should be protruded from the hole or how much recessed from the hole.

Also, in the magnetizing head 1101 which can be applied to the media processing device 1100 shown in FIG. 11, there may be a case that the magnetization to the information recording media is weak depending on the mounting precision of the magnetizing head 1101. Therefore, when a medium having a small retaining force is magnetized, it may be magnetized in the wrong direction. Then, when it is magnetized in the wrong direction, magnetic information on the information recording medium cannot be read correctly.

At least an embodiment of the present invention provides a media processing device that can prevent jams and easily position the magnetic head. Also, the second objective is to provide a magnetic head that can prevent degradation of reading accuracy of the magnetic information.

SUMMARY OF THE INVENTION

At least an embodiment of the invention provides the following:

A media processing device comprising a transport passage in which an information recording medium is transported, a frame constituting the transport passage, and a magnetic head for processing magnetic information signals on the information recording medium; wherein the magnetic head is embedded in the frame while part of the frame is interposed between the magnetic head and the transport passage.

According to at least an embodiment of the present invention, in a media processing device which has a frame constituting a transport passage and a magnetic head, the magnetic head is embedded in the frame while part of the frame is interposed [between the magnetic head and the transport passage]; therefore, unlike a conventional media processing device, the surface of the magnetizing head (the slide-contact face 1101a in FIG. 11(b)) will not be exposed to the transport passage. Note that "the magnetic information signals" may be the data (such as account number, serial number, etc.) recorded in the magnetic substance such as the MICR (Magnetic Ink Character Recognition: magnetic ink) characters printed on the front surface of a check. In addition, "the magnetic information signals are processed" for magnetizing the magnetic substance or demagnetizing the magnetic substance.

Therefore, the frame constituting the transport passage will not be discontinuous [which is normally caused] due to the presence of the magnetic head; even when an information recording medium with a folded edge is inserted, a jam in the vicinity of the magnetic head is prevented. Also, since the frame is not discontinuous in the vicinity of the magnetic head, dust can be prevented from building up around the position in the transport passage opposed to the magnetic head, thus preventing a jam with certainty.

Further, in at least an embodiment of the present invention, the magnetic head is embedded in the frame while part of the frame is interposed between [the magnetic head] and the transport passage. Therefore, the magnetic head can be fixed by the part of the frame, facilitating the positioning of the magnetic head.

Here, in the description note that "while part of the frame is interposed", the part can be of any thickness. For example, a single piece of (or multiple pieces of) thin plate-like frame(s) may be interposed or a piece of (or multiple pieces of) frames having a thickness of several mm may be interposed. Also, the part of the frame mentioned here may or may not be connected with (may be the same frame as or may be a separate frame from) the frame near the reading head or the image sensor, but it is enough if it is the part of the frame that constitutes the transport passage. Further, an embodiment of the present invention does not exclude that any member other than part of the frame is interposed between the magnetic head and the transport passage.

At least an embodiment of the present invention is a media processing device wherein the magnetic head is bonded by an adhesive to the frame on the opposite side from the transport passage.

According to at least an embodiment of the present invention, the above-mentioned magnetic head is bonded by an adhesive to the frame on the opposite side from the transport passage; therefore, shifting of the magnetic head which can be caused by vibration, etc. can be prevented, thus ensuring reliability of positioning. Also, the magnetic head can be easily attached by adhesion with an adhesive. Further, dust can be prevented from entering from a gap between the magnetic head and the frame.

It is preferred that at least an embodiment of the present invention be a media processing device wherein the magnetic head is arranged in a recess portion cut in the frame.

According to at least an embodiment of the present invention, the magnetic head is arranged in a recess portion cut in the frame; therefore, dust can be effectively prevented from entering a gap between the magnetic head arranged inside the recess portion and the frame.

It is preferred that at least an embodiment of the present invention be a media processing device wherein the magnetic head has a surface opposed to the recess portion and formed in a flat surface shape.

According to at least an embodiment of the present invention, the magnetic head has a surface opposed to the recess portion and formed in a flat surface shape; therefore, by arranging this surface to be opposed to the recess portion, the magnetic head can be easily positioned, and dust can be effectively prevented from entering a gap between the magnetic head arranged inside the recess portion and the frame.

It is preferred that at least an embodiment of the present invention be the media processing device described in any of (1) through (4) wherein part of the frame is formed of a nonmagnetic material.

According to at least an embodiment of the present invention, the above-mentioned part of the frame is formed of a nonmagnetic material; therefore, even when the magnetic head is embedded in the frame while part of the frame is interposed between the magnetic head and the transport passage, the magnetic field produced from the magnetic head will not be distorted (a magnetic property of the magnetic head will not be affected). Therefore, the information recording medium inserted into the media processing device can be appropriately magnetized. Note that "the nonmagnetic material" includes metal and resin.

Also, the magnetic head of at least an embodiment of the present invention has a magnet magnetized to the N pole and the S pole along the transport direction in which an information recording medium is transported, a yoke attached to a face of the magnet which is opposed to the information recording medium, and a gap created in the yoke, and at least one end portion of the gap is closed. According to at least an embodiment of the present invention, while maintaining precision of the gap length, the magnetic head can be easily assembled.

Also, since at least one end portion of the magnetic head is closed, the magnetic short can be established, resulting in more effective use of leakage flux.

Further, it is preferred that the magnetic head of at least an embodiment of the present invention be configured such that the yoke is extended to be longer than the magnet in the transport direction.

According to at least an embodiment of the present invention, the magnetic head (magnetizing head) is provided with the yoke attached on the outside circumferential face of the magnet opposed to the transport passage in which information recording media are transported and a slit formed in the yoke such that the longitudinal direction thereof is perpendicular to the transport direction; since the yoke is extended to be longer than the magnet in the transport direction, of the magnetic flux produced from the magnet the leakage flux which is not needed for magnetization can be reduced.

In other words, because of the yoke provided in the magnetic head and extended to be longer than the magnet in the transport direction, the leakage flux which enters the transport passage and flows in the direction opposite from the direction of the magnetic flux used for magnetization can be reduced. Therefore, when a medium having a small retaining force is transported, for example, magnetization in the wrong direction can be prevented, in turn preventing degradation of reading accuracy of the magnetic information. Also, the magnetic head of at least an embodiment of the present invention is configured such that at least one of the end portions of the slit is closed. Therefore, the leakage flux that leaks from the slit end portions can be reduced, thus preventing error in magnetization which is caused due to such a leakage flux.

In at least an embodiment of the present invention, it is preferred that the yoke be constructed from a single sheet of metal. In this way, the yoke can be easily attached to the magnet.

Also, in at least an embodiment of the present invention, it is preferred that both end portions of the gap be closed. In this way, magnetic flux leakage can be concentrated toward the information recording media.

In at least an embodiment of the present invention, the media processing device comprising a transport passage in which information recording media are transported, a frame constituting the transport passage and a magnetic head for processing magnetic information signals on the information recording media; wherein the magnetic head is embedded in the frame while part of the frame is interposed between the magnetic head and the transport passage, and also has a magnet that is magnetized to the N pole and the S pole along the transport direction in which the information recording media are transported and a gap formed in the yoke, and at least one of the end portions of the gap is closed.

According to at least an embodiment of the present invention, the presence of the magnetic head will not discontinue the frame which constitutes the transport passage; even if an information recording medium having a folded edge is inserted, a jam can be prevented from being caused in the vicinity of the magnetic head. Also, since the frame is not discontinuous in the vicinity of the magnetic head, dust is prevented from building up near the position in the transport passage opposed to the magnetic head, thus ensuring the prevention of a jam.

Also, magnetic flux leakage can be concentrated toward the information recording media.

In at least an embodiment of the present invention, the media processing device comprising a transport passage in which information recording media are transported, a frame constituting the transport passage and a magnetic head for processing magnetic information signals on the information recording media; wherein the magnetic head has a magnet magnetized to different poles along the transport direction in which the information recording media are transported, a yoke attached on the outside circumferential face of the magnet opposed to the transport passage in which the information recording media are transported, and a slit formed in the yoke such that the longitudinal direction thereof is perpendicular to the transport direction; at least one of the end portions of the slit is closed and the yoke is extended to be longer than the magnet in the transport direction.

According to at least an embodiment of the present invention, magnetic flux leakage can be concentrated toward the information recording media. Also, the leakage flux which enters the transport passage and flows in the direction opposite from the direction of the magnetic flux used for magnetization can be reduced. Therefore, when a medium having a small retaining force is transported, for example, magnetization in the wrong direction can be prevented, in turn preventing degradation of reading accuracy of the magnetic information.

The information processing device of at least an embodiment of the present invention does not have a discontinuous section in the frame in the vicinity of the magnetic head; therefore, a jam which is normally caused by the information recording medium getting stuck in the middle of the transport passage, can be prevented. By securing the magnetic head with part of the frame, the positioning of the magnetic head can be simplified.

The magnetic head of at least an embodiment of the present invention has a magnet which is magnetized to the N pole and the S pole along the transport direction in which the information recording media are transported, a yoke attached to a face of the magnet opposed to the information recording media, and a gap created in the yoke; wherein at the least one of the end portions of the gap is closed. According to at least an embodiment of the present invention, while maintaining precision of the gap length, the magnetic head can be easily assembled.

Further, according to the magnetic head of at least an embodiment of the present invention, the yoke attached to the outside circumferential face of the magnet is extended to be longer than the magnet; therefore, the leakage flux which is not needed for magnetization can be reduced, thus preventing degradation of reading accuracy of the magnetic information.

BRIEF DESCRIPTION OF DRAWING

Embodiments will now be described, by way of example only, with reference to the accompanying drawings which are meant to be exemplary, not limiting, and wherein like elements are numbered alike in several Figures, in which:

FIG. 10 is a cross-sectional side view of the configuration of a magnetic head of at least another embodiment of the present invention.

FIGS. 11(a) and 11(b) are cross-sectional side views of the configuration of a conventional media processing device.

DETAILED DESCRIPTION OF PREFERRED EMBODIMENTS

Figure 1:
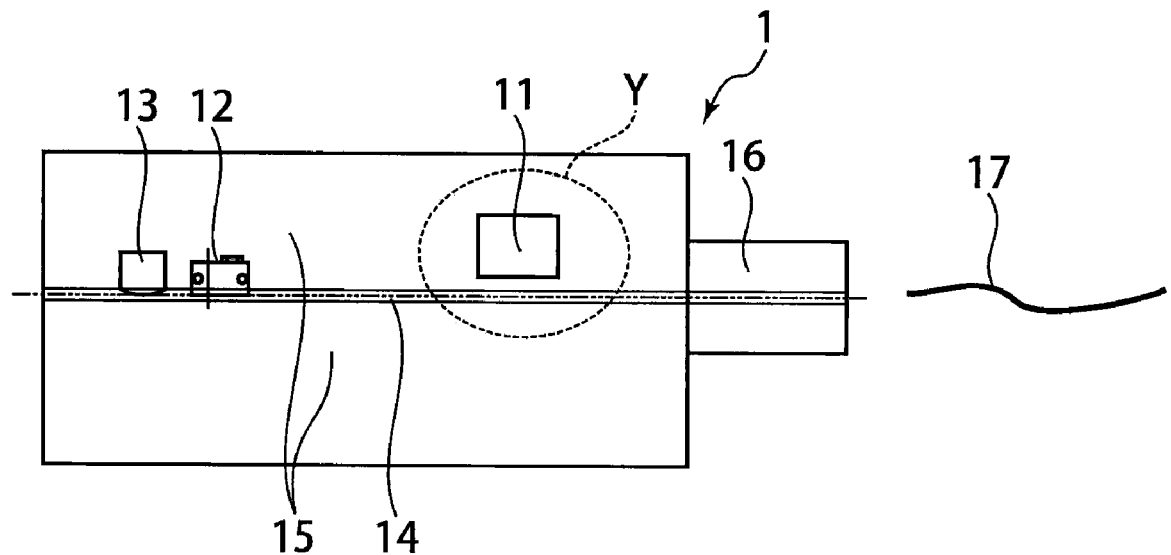
FIGS. 1(a) and 1(b) are cross-sectional side views showing the configuration of a media processing device of at least an embodiment of the present invention.
Figure 1:
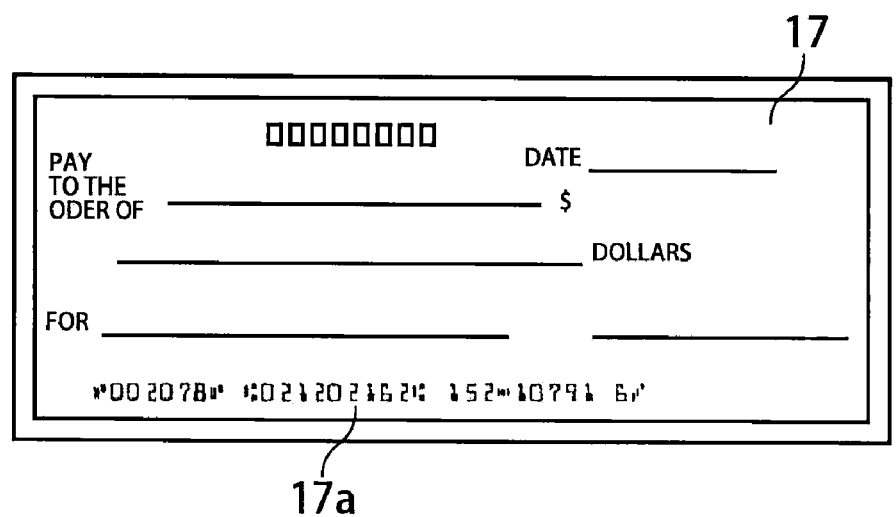

Embodiments of the present invention are described hereinafter referring to the drawing.

Media Processing Device

FIG. 1(a) is a cross-sectional side view of the configuration of a media processing device 1 of at least an embodiment of the present invention. Note that FIG. 1(b) is a diagram showing the external design of a check 17 which is inserted into the media processing device 1. Also, the media processing devices include card readers, for example, and magnetic cards other than checks may be used as information recording media.

In FIG. 1(a), a transport passage 14 in which the check 17 is transported is constructed by a frame 15 formed of a nonmagnetic material. Also, around the transport passage 14, a magnetizing head 11 (that corresponds to the magnetic head described in the claims), an image sensor 12, and a reading head 13 are arranged. Note that the check 17 is taken into the media processing device 1 via a gate 16. Also, in the media processing device 1, a drive roller (not illustrated) is provided; the drive roller applies the drive force to an endless belt (not illustrated) that forms part of the transport passage 14 so that the check 17 is transported in the transport passage 14.

The magnetizing head 11 magnetizes magnetic material printed on the front surface of the check 17 such as the MICR characters 17a (see FIG. 1(b)); the image sensor 12 scans the front surface of the check 17 and reads the image data; the reading head 13 reads the MICR characters 17a that have been magnetized by the magnetizing head 11.

The operation of the media processing device 1 having such a configuration will be described hereinafter. First, when the check 17 is inserted at the gate 16, the check 17 is detected by a detection sensor which is not illustrated and the drive roller is driven to rotate. When the drive roller is rotated, a drive force is transmitted to the endless belt and the check 17 inserted at the gate 16 is transported further inside the media processing device 1. Then, as the check 17 passes the position that faces the magnetizing head 11, the MICR characters 17a are magnetized; as the check 17 passes the position that faces the image sensor 12, the front surface of the check 17 is scanned; as the check 17 passes the reading head 13, the data recorded in the MICR characters is read.

In the media processing device 1 of this embodiment, the magnetizing head 11 is embedded in the frame 15 while a portion of the frame 15 is interposed between the magnetizing head and the transport passage. FIG. 2 will be used to describe how the magnetizing head is embedded. FIG. 2 is a cross-sectional side view of an enlargement of the vicinity of the magnetic head 11 (inside the frame Y defined by a dotted line) of the media processing device shown in FIG. 1(a).

As shown in FIG. 2, between the magnetic head 11 and the transport passage 14, a portion of the frame 15 is interposed. In other words, the bottom face of the magnetizing head 11 in the figure (since the transporting passage 14 is not discontinuous, even when the edge of the check 17 is folded, a jam is prevented from being caused in the vicinity of the magnetizing head 11. Also, the surface of the transport passage 14 opposed to the magnetizing head 11) is not exposed to the transport passage 14. Therefore, dust accumulation is prevented near the position opposed to the frame constituting the transport passage 14, ensuring the prevention of a jam.

Further, as shown in FIG. 2, the magnetizing head 11 is arranged in the recess portion 15a cut in the frame 15 and bonded by an adhesive 20 to the frame 15 on the side opposite from the transport passage 14. Therefore, the magnetic head 11 can be secured to the frame, obtaining reliability of the positioning. Also, the magnetizing head 11 can be easily mounted. Further, because of the adhesive 20, dust is prevented from entering the gap between the magnetizing head 11 and the frame 15.

Figure 3:
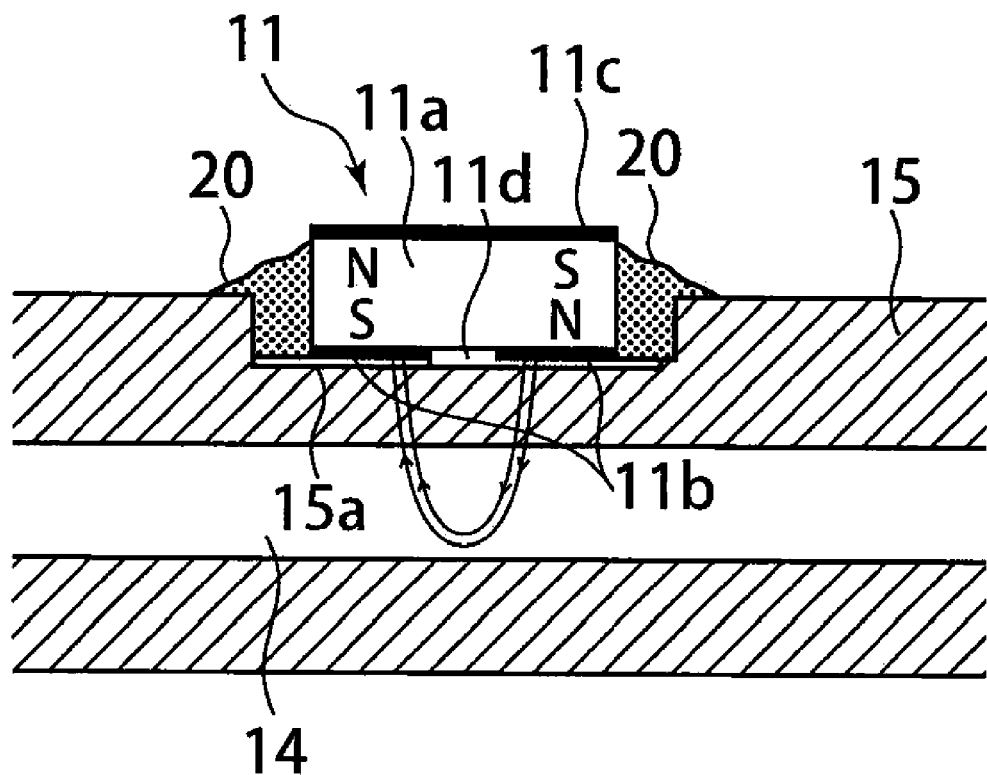
FIGS. 3(a) and 3(b) are diagrams showing an example of the detailed configuration of the magnetizing head shown in FIG. 1(a).
Figure 3:
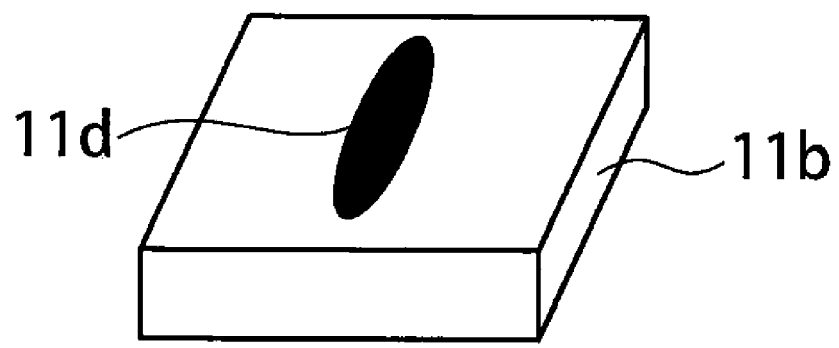

FIG. 3 is a diagram showing an example of the detailed configuration of the magnetizing head 11 shown in FIG. 1(a).

As shown in FIG. 3(a), the magnetizing head 11 in the media processing device 1 is in a shape of rectangular solid, composed of a permanent magnet 11a, a front yoke 11b and a back yoke 11c. As shown in FIG. 3(b), in the center of the front yoke 11b an oblong slit 11d is formed, and the slit 11d functions as a gap to cause leakage flux from the permanent magnet 11a.

In such a configuration, the magnetic flux produced from the N pole of the permanent magnet 11a (the N pole on the right side in FIG. 3(a)) mainly passes the front yoke 11b near the slit 11d, the frame 15, the transport passage 14, the frame 15, and the front yoke 11b near the slit 11d, and then returns to the S pole of the permanent magnet 11a (the S pole on the left side in FIG. 3(a)).

Note that the depth of the recess portion 15a in the frame 15 or the distance between the recess portion 15a and the transport passage 14 is configured such that, considering the magnetic force of the permanent magnet 11a or the magnetic force necessary to magnetize the MICR characters, the MICR characters formed on the check 17 transported in the transport passage 14 can be magnetized. For example, in this embodiment, as shown in FIG. 3(a), magnetic flux produced from the N pole of the permanent magnet 11a (the N pole on the right side in FIG. 3(a)) is at the strength with which it flows through the inside of the transport passage 14, i.e., it reaches the other frame which the magnetizing head 11 is not provided.

As shown in FIG. 3(a), the bottom face of the recess portion 15a of the frame 15 is in a flat shape, and the back face of the front yoke 11b opposed to bottom face in the flat shape (the face opposed to the transport passage 14) is also made in a flat shape, not in an R shape. Therefore, the positioning between the magnetizing head 11 and the frame 15 can be simplified. Also, a normal magnetizing head 11 is covered by a case cover formed of aluminum, for example; however, the case cover can be omitted by using the recess portion 15a and the adhesive 20. This contributes to cost reduction.

Note that the above embodiment is an example of preferred embodiments of the present invention; however, the present invention is not limited to this embodiment and can be variously modified within the scope of the present invention.

For example, without cutting the recess portion 15a in the frame 15, the magnetizing head 11 may be simply fixed (by applying pressure) on the frame 15. Note that the adhesive 20 may be applied around the periphery of the magnetizing head 11. Also, the dimension of the recess portion 15a cut in the frame 15 may be aligned with the dimension of the magnetizing head 11 so that the magnetizing head 11 is fitted into the recess portion 15a. In this way, the magnetizing head 11 can be positioned without using the adhesive 20.

On the other hand, the material of the frame 15 may be changed. The frame 15 is formed of a resin material which is an example of a nonmagnetic material. Alternately, a ceramic frame may be used instead of the frame of a resin material. Note that, although the frame formed of a metal is used, the above materials may be used. Any material can be used as long as the magnetic flux produced from the magnetizing head 11 magnetizes the MICR characters formed on the check 17 which is transported in the transport passage 14.

First Embodiment of Magnetic Head

Next, a magnetizing head (magnetic head) that can be applied to the media processing device 1 for processing checks having the MICR characters printed thereon will be described in detail. Note that, although the magnetizing head is used for magnetizing the MICR characters, it is not limited to this use, but may be used as a demagnetizing head for weakening magnetization of the MICR characters.

Figure 4:
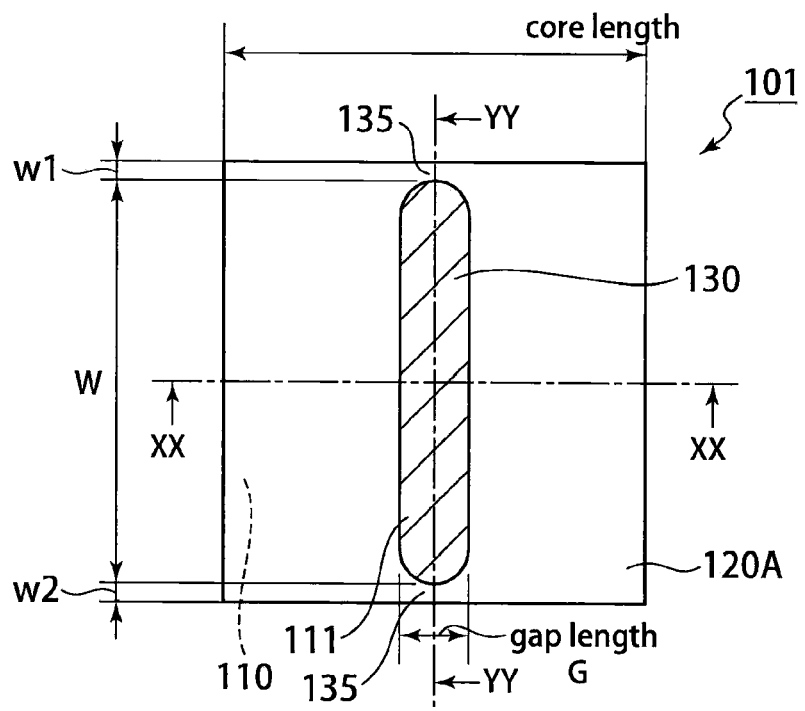
FIGS. 4(a)-4(c) are diagrams showing the magnetic head of at least an embodiment of the present invention: 4(a) is a front view of the plane that makes contact with an information recording medium (not illustrated); 4(b) is a cross-sectional side view of (a), cutting along the xx-xx line; 4(c) is a cross-sectional side view of (a), cutting along the yy-yy line.
Figure 4:
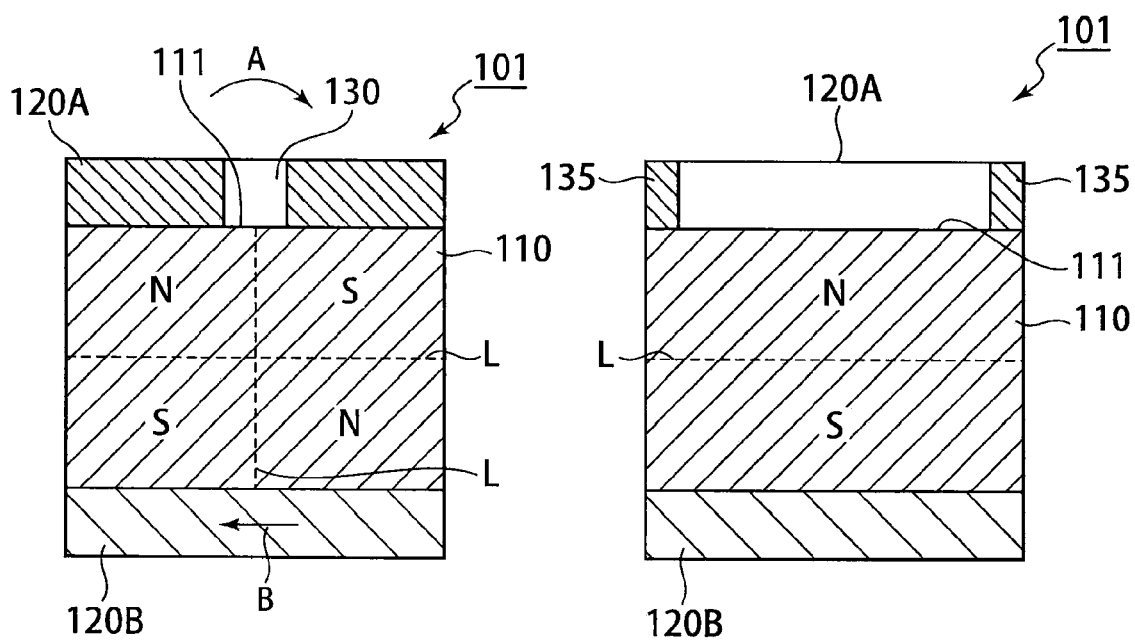

FIG. 4 is diagrams showing the magnetic head of at least an embodiment of the present invention: (a) is a front view of the surface of the magnetic head that makes contact with the information recording media (not illustrated); (b) is a cross-sectional side view of (a) cut along the xx-xx line; (c) is a cross-sectional side view of (a) cut along the yy-yy line.

As shown in FIGS. 4(b) and (c), the magnetizing head 101 as a magnetic head has a cuboid magnet 110 having the N poles and the S poles, a yoke 120A and a back yoke 120B attached sandwiching the magnet 110 between them, and a gap 130 created in the yoke 120A.

The magnet 110 is a cuboid permanent magnet and, as shown in FIG. 4(b), magnetized to four poles of the N poles and the S poles in the cross section perpendicular to the media-transport direction. Note that the border line L between the N poles and the S poles is indicated by dotted lines in FIG. 4 for easy description. The magnet 110 can be any kind as long as it is a permanent magnet; in this embodiment, a stable ferrite magnet is used because of its large coercive force and resistance to demagnetization.

On the side of the magnet 110 which faces the check as an information magnetic medium, the yoke 120A is secured by an adhesive, etc.; in the same manner, the back yoke 120B is secured by an adhesive, etc. on the opposite side of the magnet 110. As shown in FIG. 4(a), the yoke 120A is in the same dimension with that of the shape of the surface 111 of the magnet 110 on the side where the check slides over, covers the surface of the magnet 110 (entirely), and is formed from a single sheet of metal in this embodiment.

In the same manner, the back yoke 120B is machined to the same dimension as that of the shape of the surface 111 of the magnet 110 and secured by an adhesive or the like so as to cover the surface of the magnet 110 (entirely).

The yoke 120A and the back yoke 120B are formed of a magnetic material and used to direct the magnetic flux supplied from the magnet 110 in a predetermined direction. Therefore, unnecessary leakage flux from the magnet 110 is prevented. Also, the material of the yoke 120A and back yoke 120B can be any material as long as it is easy to machine and can be magnetized; a ferromagnetic material having various kinds of soft magnetic properties or half-hard magnetic properties can be used. In this embodiment, a metal sheet is used.

Note that, in the first embodiment of the magnetic head, while the thickness of the magnet 110 is 5 mm, the yoke 120A is about 1 mm thick. Also, the back yoke 120B is about 1 mm thick. In other words, to increase productivity, the yoke 120A and the back yoke 120B are molded of the same material.

In the yoke 120A a gap 130 is created along the border line, L, to cause leakage flux. In this embodiment, the gap 130 is shaped like a groove; the bottom portion thereof reaches to the surface 111 of the magnet 110, that is, the magnet 110 is exposed. In this embodiment, also, the groove that configures the gap 130 is constructed such that the width thereof is the same on both the media-sliding side and the magnet 110 surface side.

The gap 130 has a predetermined length (hereinafter denoted as a gap length G) in the transport direction of the check (information magnetic medium) and a predetermined width, W, in the direction perpendicular to the transport direction of the check. The width, W, is equal to or slightly longer than the width of the data region created on the check that is being transported.

The gap length, G, is formed to be symmetric in the transport direction about the border line L. Note that, in the first embodiment, the gap length G is created integrally into the shape of the yoke 120A by pressing.

In this embodiment, both end portions of the area (position) of the gap 130 in the direction perpendicular to the transport direction of the check are closed; they are made as the closed sections 135. Further, in this embodiment, the closed sections 135 function as a magnetic short that shorts magnetism to reduce the generation of leakage flux.

The gap 130 is created in a shape best suited for magnetization and demagnetization of normal checks; when an information recording medium is something other than a check, the design of the gap is modified according to the magnetic section of the information recording medium.

In this embodiment, the yoke 120A is 1 mm thick, and the closed sections 135 have the widths w1, w2 of about 1 mm measured from the end portions on both sides of the yoke 120A. The widths w1, w2 of the closed sections 135 are not limited to the number set in the first embodiment; although the two widths w1, w2 of the closed sections 135 are set to the same number value from each other, 1 mm in this embodiment, they are not limited to the same width and the number value, 1 mm, but can be suitably changed to function according to the kinds of the information recording media which will be transported.

Note that when the widths w1, w2 of the closed sections 135 are large, there will be no magnetic saturation and leakage flux at the gap 130 is reduced; therefore, the widths are suitably set through simulations.

In this embodiment, the closed sections 135 are formed at the both ends of the gap 130; therefore, leakage flux is not easily produced in this structure except toward the information recording medium. In other words, the magnetic head 101 has the closed sections 135 which shorts magnetism, thus preventing excessive flux leakage. Further, leakage flux can be increased in the transport direction of the information recording media.

Next, a recording method is described.

The magnetizing head 101 as a magnetic head is configured such that the yoke 120A having the gap 130 is fixed on the magnet 110 to create an annular magnetic path. In the yoke 120A, internal magnetic flux is produced from the yoke 120A that covers the N pole to the yoke 120A that covers the S pole; in the gap 130, leakage flux is generated from the yoke 120A that covers the N pole to the yoke 120A that covers the S pole, as indicated by arrow A. A check (information recording medium) is transported toward the magnetizing head 101 and slides on the surface of the yoke 120A of the magnetizing head 101. In the vicinity of the gap 130, leakage flux has been produced which links with the MICR characters on the check for magnetization. Since the permanent magnet 110 is used in the first embodiment, the MICR characters on the check are magnetized uniformly by magnetization of constant size and direction.

Also, in this embodiment, the magnetic head 101 has the back yoke 120B fixed on the magnet 110; in the back yoke 120B, the direction of internal magnetic flux is indicated by B as shown in FIG. 4(b). In other words, the back yoke 120B is a magnetic short that shorts magnetism of the magnet 110. This configuration reduces the generation of unnecessary leakage flux to the outside.

Effects of First Embodiment

The magnetizing head 101 as a magnetic head of this embodiment has the magnet 110 which is magnetized to the N pole and the S pole along the direction in which a check as an information recording medium is transported, the yoke 120A attached to the face of the magnet 110 opposed to the check, and the gap 130 created in the yoke 120A, and the closed section 135 is formed at least one of the end portions of the gap. Because of this configuration, the magnetizing head 101 can be easily assembled while maintaining precision of the gap length, G.

Further, since the yoke 120A is constructed from a single sheet of metal, the yoke 120A is fixed onto the surface 111 of the magnet 110 by using an adhesive so that the magnetic head 101 can be easily installed while maintaining precision of the gap length, G, and no effort is required for the positioning of the gap 130.

Since the magnetizing head 101 can short magnetism with the closed sections 135 created at both ends of the gap 130, leakage flux from the gap 130 can be effectively used; since leakage flux is generated in the transport direction of the check, the flux quantum can be increased. In other words, leakage flux can be concentrated in the transport direction of the check because of the closed sections 135 created in the yoke 120A. Further, excessive flux leakage can be prevented; therefore, the magnet can be downsized, thus making it possible to downsize checks or information recording media.

Furthermore, the back yoke 120B is attached to the face of the magnet 110 on the opposite side from the face that faces the check; therefore, magnetic flux from the magnet is directed to the back yoke 120B to prevent the magnetic flux from flowing to the core of the magnetizing head 101.

Other Embodiment

Note that, although the above-described embodiment is an example of the preferred embodiments of the present invention, the present invention is not limited to this embodiment, but can be variously modified within the scope of the invention.

For example, the yoke 120A and the back yoke 120B are formed in a shape to cover the surface 111 of the magnet 110 and the opposite surface from the surface 111; however, the shape is not limited to this. They may not be formed from a single sheet of metal, but the gap and the closed sections may be formed first and then the closed sections are joined together to create a single yoke. Even in this case, the closed sections make contact with each other to obtain precision of the gap length, G.

Also, the thickness of the yoke 120A and the back yoke 120B can be any thickness as long as the thickness functions according to the type of the information recording media which are transported, and thus can be changed accordingly.

Figure 5:
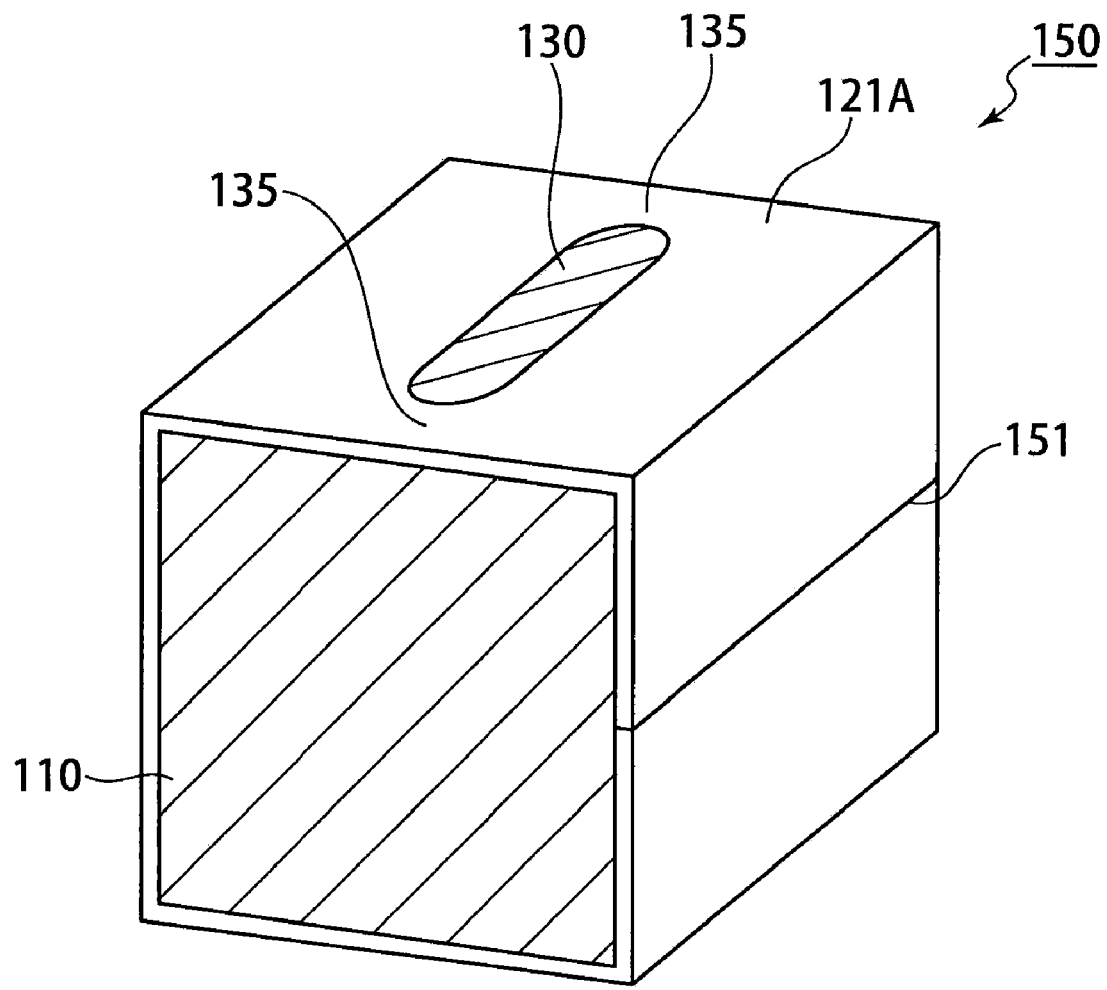
FIG. 5 is a diagram showing a media processing device in which the magnetic head of at least an embodiment of the present invention is applied.

FIG. 5 is a diagram showing a magnetic head of at least another embodiment of the present invention. Note that the same codes are given to the same components as those of the above-described first embodiment. In a magnetizing head 150 as a magnetic head, a yoke and a back yoke are formed integrally, and a yoke 121A constructed from a single sheet of metal is used to cover the periphery of the magnet 110. The yoke 121A surrounding the periphery of the magnet directs magnetic flux supplied from the magnet 110 in a predetermined direction. Therefore, in the same manner as the yoke 120A and back yoke 120B shown in FIG. 4, unnecessary leakage flux from the magnet 110 is prevented.

Note that the magnetizing head 150 has the cuboid magnet 110 magnetized to the N pole and the S pole, the yoke 121A attached covering the magnet 110, and the gap 130 created in the yoke 121A, in the same manner as in FIG. 4. The magnet 110 is covered with the yoke 121A provided with the gap 130. At the both end portions of the gap 130, the closed sections 135 are formed. In this embodiment, the yoke 121A also functions as the back yoke.

Note that, in this embodiment, the shape of the gap 130 and the closed sections 135 formed near the gap 130 are the same as those shown in FIG. 4, and their description is omitted.

In this embodiment, the yoke 121A is formed so as to cover the magnet 110 around its periphery, that is, it is formed in a so-called carling shape having the end portions 151 to also cover the two sides of the magnet formed in the transport direction of the check. In other words, the yoke 121A is constructed from a single sheet of metal member. More specifically described, the yoke 121A covers four sides of the magnetizing head 150. Note that the yoke 121A may be shaped as a cylinder without the end portions 151.

According to the above-described magnetizing head 150, the yoke 121A covers four sides; therefore, the generation of excessive leakage flux can be further reduced and magnetic force is increased, making it possible to downsize the magnet 110, which in turn downsizes the magnetizing head 150.

Figure 6:
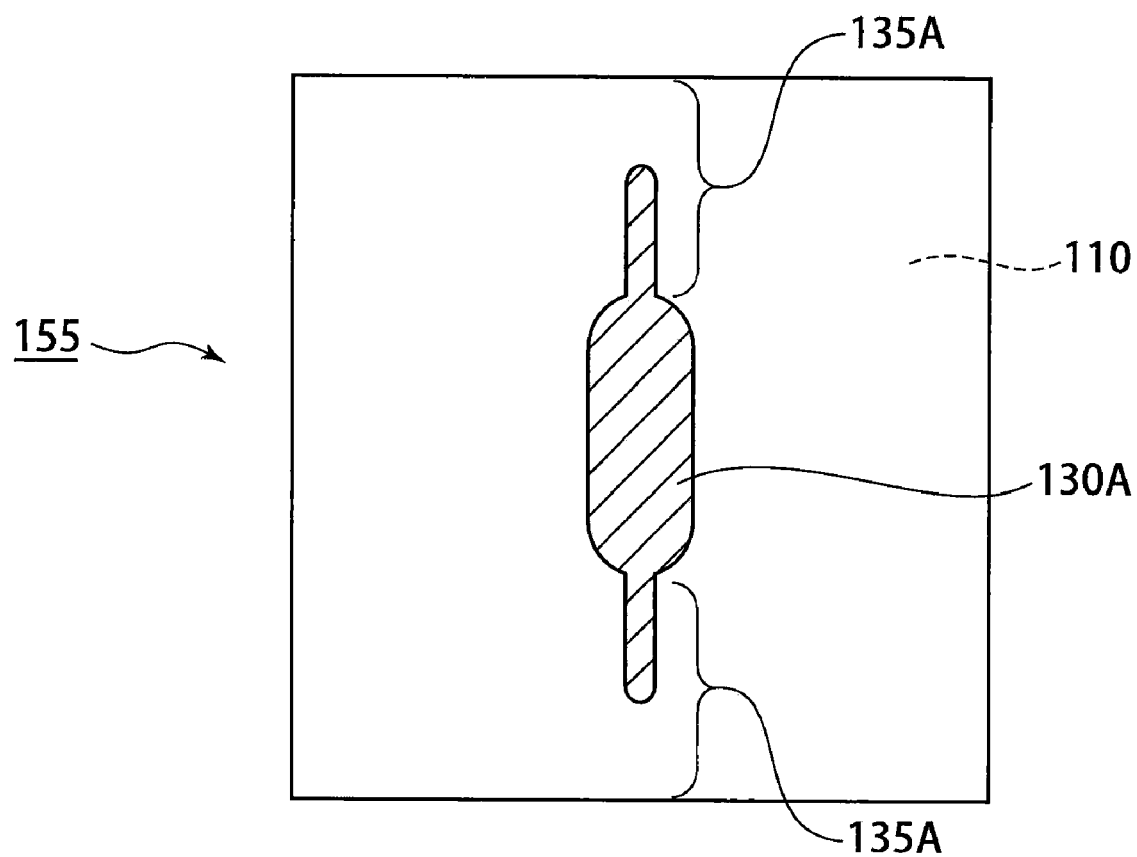
FIG. 6 is a diagram showing a magnetic head of at least another embodiment of the present invention.

The shape of the closed section 135 is not limited to the one shown in FIG. 4, but may be the one in a magnetizing head 155 shown in FIG. 6. In other words, each of the closed sections 135A shown in FIG. 6 is constructed with the joined portion and the groove portion which is shorter in length than the gap length, G. Leakage flux will be generated from the groove portion to some extent; however, the groove portion has the function of magnetic short, as described above.

Note that, as shown in FIG. 6, the magnetizing head 155 has the cuboid magnet 110 magnetized to the N pole and the S pole, a yoke 122A and a back yoke (not illustrated) having the magnet 110 interposed between them, and a gap 130A created in the yoke 122A. The yoke 122A provided with the gap 130A is attached so as to cover the magnet 110.

The magnet 110 used in the magnetizing head as a magnetic head shown in FIG. 4 through FIG. 6 may be configured by a combination of divided magnets.

Second Embodiment

Next, the second embodiment of the magnetizing head (magnetic head) that can be applied to the media processing device of at least an embodiment of the present invention will be described referring to FIG. 7 through FIG. 10. Note that, although between the magnetizing head 211, 211A, 211B, 211C shown in FIG. 7 through FIG. 10 and the transport passage 14, part of the frame 15 is interposed and embedded as shown in FIG. 3($a$), the illustration of the part of the frame 15 is omitted to simplify the drawing.

Figure 2:
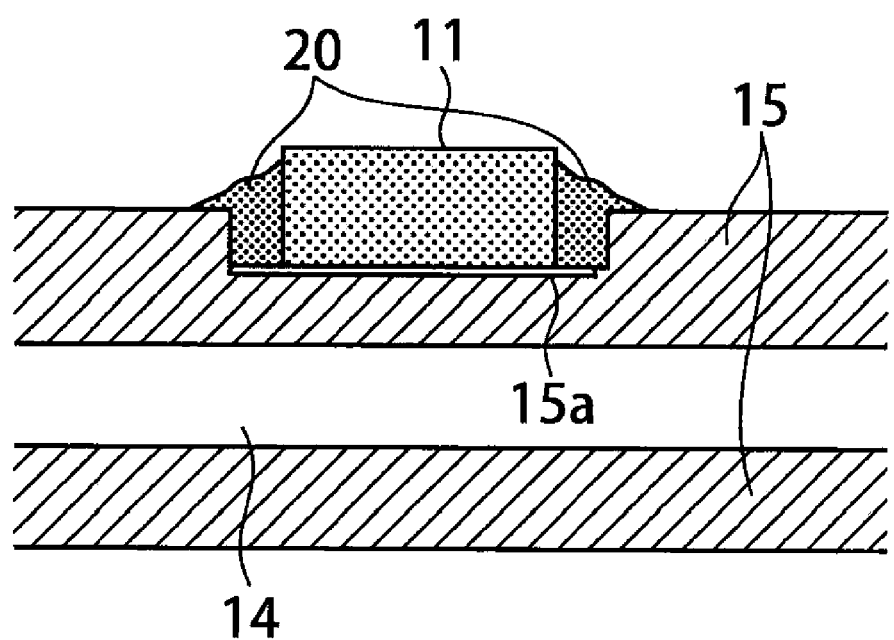
FIG. 2 is a cross-sectional side view of an enlargement of the vicinity of a magnetizing head (inside the frame Y defined by a dotted line) of the media processing device shown in FIG. 1(a).
Figure 7A:
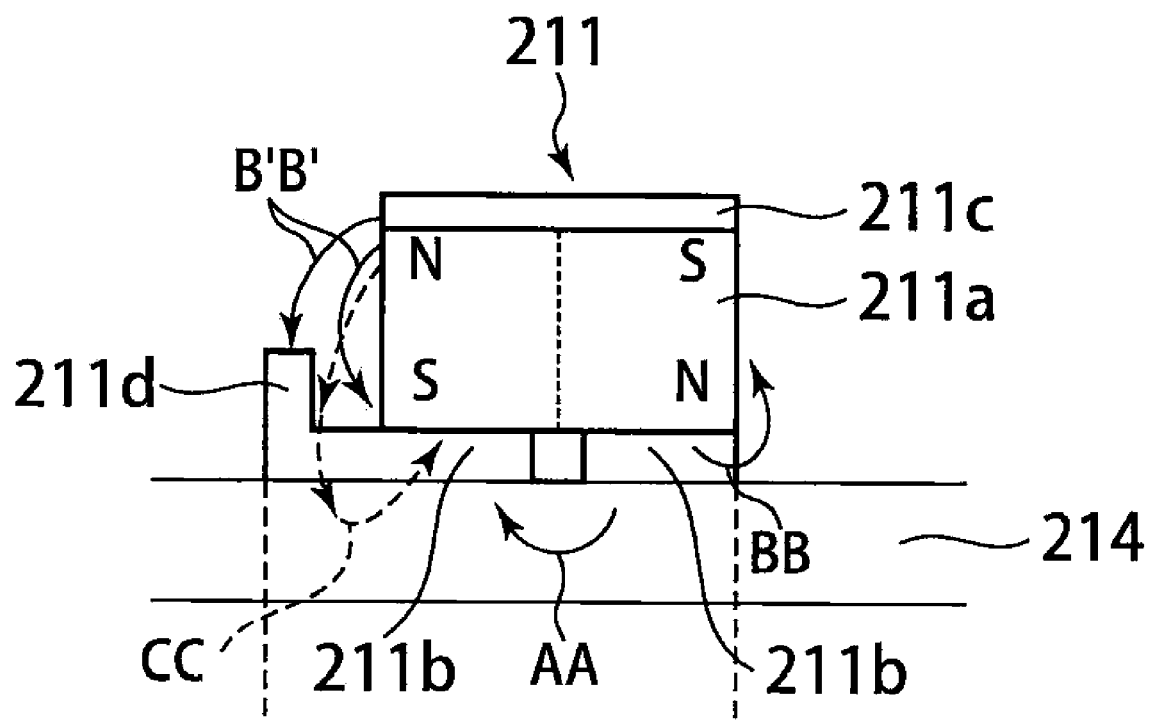
FIG. 7 is a cross-sectional view of an enlargement of the vicinity of the magnetic head (inside the frame Y defined by a dotted line) of the media processing device of FIG. 1(a).
Figure 7:
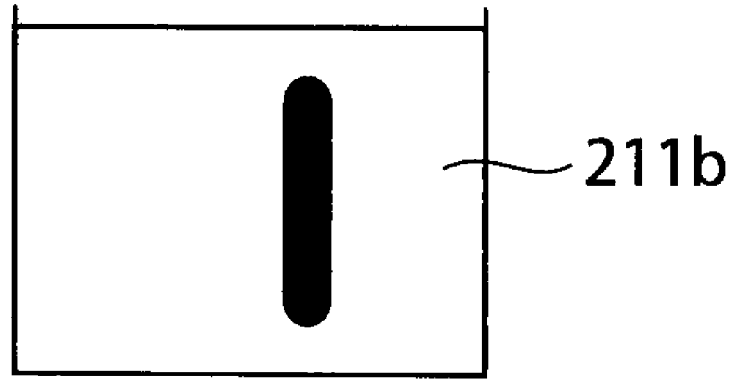

FIG. 7 is a cross-sectional side view of an enlargement of the vicinity of the magnetizing head (inside the frame Y defined by a dotted line) that can be applied to the media processing device 1 shown in FIG. 1($a$).

As shown in FIG. 7($a$), a magnetizing head 211 of the second embodiment is composed of a magnet 211$a$ magnetized to different poles (from the N pole to the S pole in FIG. 7($a$)) along the transport direction (from right to left in FIG. 7($a$)) in which a check 17 is transported, a yoke 211$b$ attached to a face of the outside periphery of the magnet 211$a$ opposed to the transport passage 14 in which the check 17 is transported, and a back yoke 211$c$ attached to another face of the outside periphery of the magnet 211$a$ on the opposite side from the face opposed to the transport passage 14. Note that the magnetizing head 211 is positioned (fixed) by an adhesive such as epoxy on the guide (such as a nonmagnetic SUS sheet) constituting the inside peripheral surface of the transport passage 14 such that the top and bottom end faces of the magnet 211$a$ are parallel with respect to the check 17.

FIG. 7($b$) is a view of the yoke 211$b$ seen from the transport passage. As shown in FIG. 7($b$), the yoke 211$b$ is constructed from a single sheet of metal, and a slit (also called "magnetic gap") is created in part of the yoke such that the longitudinal direction thereof is perpendicular to the transport direction (see the black colored portion in FIG. 7($b$)). The slit has both end portions closed.

In the media processing device 1 of at least an embodiment of the present invention, the yoke 211b constituting the magnetizing head 211 is extended toward the reading head 13 to be longer than the magnet 211a in the transport direction of the check 17. Magnetic flux produced from the magnet 211a is divided into magnetic flux used for magnetization (see the arrow AA in FIG. 7(a)) and leakage flux which is not needed for magnetization (see the arrows BB, B'B' of FIG. 7(a)); because of the structure of the yoke 211b, the latter leakage flux is directed to the yoke 211b and does not easily enter the transport passage 14; therefore, leakage flux which is not needed for magnetization is reduced from entering the transport passage 14. More specifically described, if the yoke 211b is not extended longer toward the reading head 13, much of leakage flux flowing in the direction opposite from the arrow AA enters the transport passage 14 as indicated by the dotted line arrow CC in FIG. 7 (c). On the other hand, when the yoke 211b is extended longer toward the reading head 13 as in this embodiment, the leakage flux indicated by the dotted line arrow CC flows like the leakage flux indicated by the arrow B'B', which does not enter the transport passage 14 easily. Consequently, the leakage flux directed opposite (see the dotted line arrow CC) from the direction of the magnetic flux which is used for magnetization (see the arrow AA) can be reduced (or prevented), thus preventing degradation of reading accuracy of magnetic information.

Also, the front end portion of the yoke 211b shown in FIG. 7(a) is bent toward the back yoke 211c to form a return yoke portion 211d. With this configuration, magnetic flux which is not needed for magnetization, that is the leakage flux indicated by a solid line arrow B'B', is guided to the yoke portion 211b via the return yoke 211d. As a result, a magnetic path having a low magnetic resistance is formed by the yoke 211b, the return yoke portion 211d, and the back yoke 211c; therefore, the leakage flux entering the transport passage 14 can be effectively reduced.

Further, there is a gap of a predetermined distance between the return yoke portion 211d and the magnet 211a. By adjusting the distance for the gap to an optimal value, magnetic flux used for magnetization can be increased while reducing leakage flux entering the transport passage 14. In other words, when the return yoke portion 211d is formed too large, leakage flux entering the transport passage 14 is reduced but also magnetic flux used for magnetization (see the arrow AA) may be reduced. Therefore, the size of the return yoke portion 211d and the gap between the return yoke portion 211d and the magnet 211a are to be adjusted to optimal values.

As described above, according to the magnetizing head 211 of this embodiment, the yoke portion 211b is extended toward the reading head 13; therefore, of the magnetic flux from the magnet 211a, the unnecessary leakage flux which enters the transport passage 14 (indicated by the dotted line arrow CC in FIG. 7(a)) can be reduced (or prevented), thus preventing degradation of reading accuracy of the magnetic information. Also, with the yoke 211b (and the return yoke portion 211d) a manufacturing process of creating a slit in the yoke in which two pieces of sheets, each of which has a recess portion, are put together is not needed; thus, the manufacturing process can be simplified. It is desirable that magnetic permeability of the yoke 211b be even everywhere along the yoke; however, when the yoke is constructed from multiple metal sheets, it may be necessary to adjust magnetic permeability. In contrast, a yoke composed of a single sheet of metal does not require such adjustment.

Also, since both end portions of the slit created in the yoke 211b are closed, more leakage flux can be reduced compared to the configuration with only one end portion closed.

Further, the back yoke 211c is attached to the face on the outside periphery of the magnet 211a on the opposite side from the face opposed to the transport passage 14; therefore, a magnetic path (magnetic circuit) having a low magnetic resistance can be formed on the face of the magnet on the opposite side from the face opposed to the transport passage 14, and consequently, leakage flux from this face can be reduced.

Also, in a general magnetizing head that has the N pole to S pole arranged in this order from the gate toward the reading head, leakage flux directed in the opposite direction is easily generated in the vicinity of the yoke near the reading head (the S pole); however, in the magnetizing head 211 of this embodiment, leakage flux can be reduced even by the return yoke portion 211d as described above and also reduced by adjusting the gap between the magnet 211a and the return yoke portion 211d.

For example, the shorter the distance of the above-described gap, the less leakage flux entering the transport passage 14. However, if the distance is shortened too much, the magnetic flux used for magnetization (the magnetic flux produced in the vicinity of the slit) will be reduced as well. Therefore, a predetermined distance needs to be set to an optimal value based on the relationship between the magnetic flux generated in the vicinity of the slit and the leakage flux which is not needed for magnetization.

Note that, according to the magnetizing head 211 of this embodiment, there is no need to provide an opening to the guide which constitutes the inner peripheral face of the transport passage 14, thus simplifying the manufacturing process. Also, the slit adjustment between the surface of the magnetic head 211 and the surface of the check 17 can be managed by the thickness of the sheet of the guide; therefore, the adjusting step is not needed, thus simplifying the manufacturing process. Further, since the outside dimension of the magnetic head 211 is small, freedom in designing the media processing device 1 is improved. An installation holder to the media processing device 1 can also be eliminated.

Figure 8:
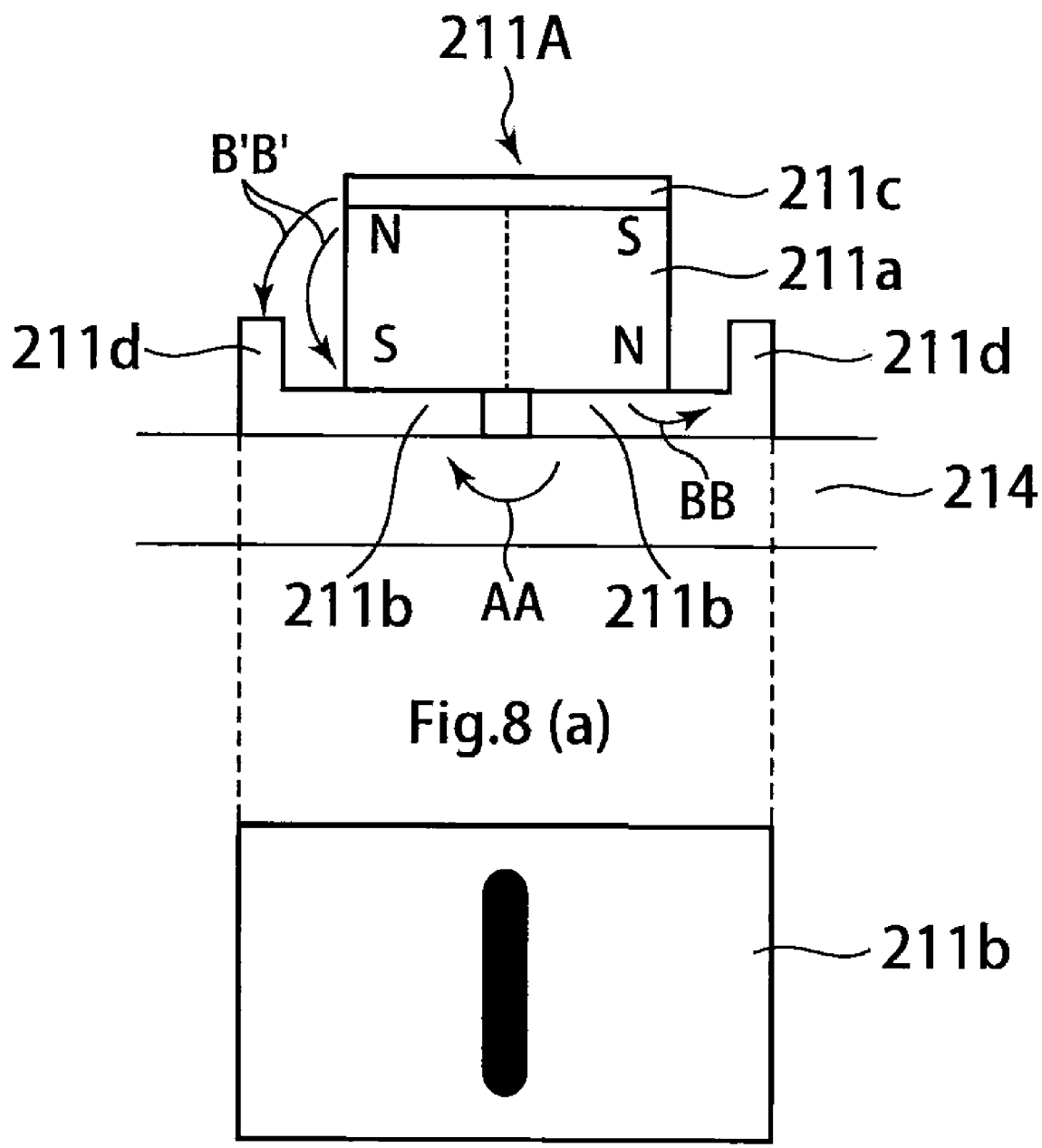
FIG. 8 is an explanatory diagram of the configuration of a magnetic head of at least another embodiment of the present invention.

Note that, although the above embodiment is an example of the preferred embodiments of the present invention, the present invention is not limited to this embodiment, but can be variously modified within the scope of the present invention. For example, FIG. 8 is an explanatory illustration of the configuration of a magnetizing head 211A in the media processing device 1 of at least another embodiment of the present invention. In FIG. 7(a), the yoke portion 211b is extended toward the reading head 13 only; however, as shown in FIG. 8, the yoke portion 211b may also be extended in the opposite direction from the reading head 13.

Figure 9:
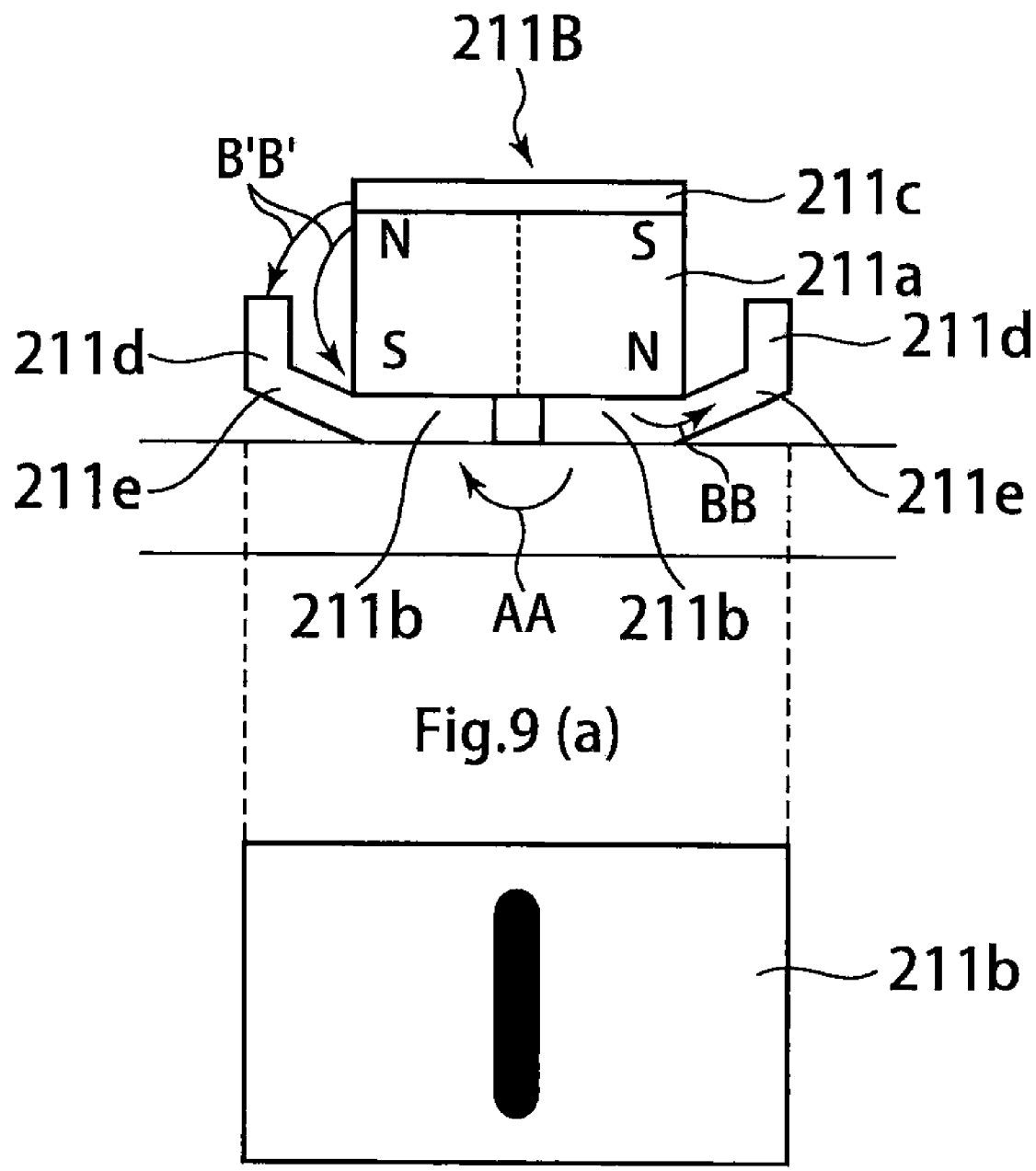
FIG. 9 is a cross-sectional side view of the configuration of a magnetic head of at least another embodiment of the present invention.

FIG. 9 is a cross-sectional side view of the configuration of a magnetizing head 211B of a media processing device 1 of at least another embodiment of the present invention.

As shown in FIG. 9, in the magnetizing head 211B, the return yoke portion 211d may be formed at the tip end of an inclining portion 211e which is formed by bending part of the yoke portion 211b. There is no need to specify that the part of the yoke portion 211b be bent at obtuse angle or curled; it can be formed in any shape.

Since the inclining portion 211e is provided in this manner, in the return yoke portion 211d there is no portion which is bent at right angle in the vicinity of the transport passage 15; therefore, unnecessary magnetic flux is prevented from flowing toward the transport passage 15. Also, when such a magnetizing head 211B is used, it may be arranged as in a conventional magnetic head such that its slide-contact surface, that is the yoke portion 211b, is exposed from the frame 15 to the transport passage 14. In other words, the frame 14 is not discontinuous in the vicinity of the magnetic head 211B; therefore, dust is prevented from building up near the position in the transport passage 15 facing the magnetic head 211B, thus preventing a jam.

FIG. 10 is a cross-sectional side view of the configuration of a magnetic head 211C in the media processing device 1 of at least another embodiment of the present invention. In the above-described media processing device 1 (see FIG. 7 through FIG. 9), the return yoke portion 211d is provided; however the device may be configured without the return yoke portion as shown in FIG. 10. In this case, processability is improved because the return yoke portion 211d is not formed.

Also, the present invention is not limited to the above configuration, but the yoke may be extended only toward the reading head and the return yoke portion may be omitted.

Further, the back yoke may be removed from the magnetizing head. Thus, it is possible to reduce leakage flux leaking from the yoke to the outside even without the back yoke.

Furthermore, only one of the end portions of the yoke may be closed. With such a configuration, leakage flux can be reduced. Also, the yoke may be formed not from a single sheet of metal but by combining two metal sheets (left yoke, right yoke), each of which has a recess portion.

Moreover, the magnetizing head may be arranged such that the slide-contact surface of the magnetizing head shown in FIG. 3 through FIG. 10, that is the return yoke portion, is exposed from the frame to the transport passage.

The media processing device is useful to prevent jams and to simplify the positioning of the magnetic head. Also, the magnetic head is useful to reduce leakage flux which is not needed for magnetization so that degradation of reading accuracy of the magnetic information can be prevented.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A media processing device comprising:
a frame comprising therein a a transport passage in which information recording media are transported; and
a magnetic head for processing magnetic information signals on said information recording media;
wherein said magnetic head is embedded in said frame and part of said frame is interposed between said magnetic head and said transport passage;
said magnetic head is bonded by an adhesive to said frame on an opposite side from said transport passage.

2. The media processing device as set forth in claim 1 wherein said magnetic head is arranged in a recess portion cut in said frame.

3. The media processing device as set forth in claim 2 wherein said magnetic head has a surface which is opposed to said recess portion and formed in a flat surface shape.

4. The media processing device as set forth in claim 1 wherein part of said frame is formed of a nonmagnetic material.

5. A magnetic head comprising:
a magnet magnetized to the N pole and the S pole along a transport direction in which information recording media are transported;
a yoke attached to a face of said magnet opposed to said magnetic recording media; and
a gap created in said yoke;
wherein at least one end portion of said gap is closed.

6. The magnetic head as set forth in claim 5 wherein said yoke is extended to be longer than said magnet in said transport direction.

7. The magnetic head as set forth in claim 6 wherein said yoke is configured by a single sheet of metal.

8. The magnetic head as set forth in claim 5 wherein said yoke is configured by a single sheet of metal.

9. The magnetic head as set forth in any of claim 5 wherein two end portions of said gap are closed.

10. A media processing device comprising:
a frame comprising therein a transport passage in which information recording media are transported; and
a magnetic head for processing magnetic information signals on said information recording media;
wherein said magnetic head is embedded in said frame while part of said frame is interposed between said magnetic head and said transport passage, and said magnetic head has a magnet magnetized to the N pole and the S pole along the transport direction in which said information recording media are transported, a yoke attached to a face of said magnet opposed to said information recording media, and a gap created in said yoke, and at least one of the end portions of said gap is closed.

11. A media processing device comprising:
a frame comprising therein a transport passage in which information recording media are transported; and
a magnetic head for processing magnetic information signals on said information recording media;
wherein said magnetic head is arranged in said frame, and said magnetic head has a magnet magnetized to different poles along a transport direction in which said information recording media are transported, a yoke attached to a face of the outside periphery of said magnet opposed to said transport passage in which said information recording media are transported, and a slit created in said yoke such that the longitudinal direction thereof is perpendicular to said transport direction, at least one end portion of said slit is closed, and said yoke is extended to be longer than said magnet in said transport direction.

* * * * *